(12) United States Patent
Alexander

(10) Patent No.: US 10,177,937 B2
(45) Date of Patent: Jan. 8, 2019

(54) ADAPTIVE CHANNEL ESTIMATION

(71) Applicant: Cohda Wireless Pty Ltd., North Adelaide (AU)

(72) Inventor: Paul Dean Alexander, Crafers (AU)

(73) Assignee: Cohda Wireless Pty Ltd., North Adelaide (AU)

( * ) Notice: Subject to any disclaimer, the term of this patent is extended or adjusted under 35 U.S.C. 154(b) by 4 days.

(21) Appl. No.: 15/362,417

(22) Filed: Nov. 28, 2016

(65) Prior Publication Data

US 2017/0155528 A1    Jun. 1, 2017

(30) Foreign Application Priority Data

Nov. 27, 2015    (AU) ................................. 2015904910

(51) Int. Cl.
    *H04L 27/26*     (2006.01)
    *H04L 25/02*     (2006.01)
    *H04L 29/06*     (2006.01)
    *H04L 1/00*     (2006.01)

(52) U.S. Cl.
    CPC ........ *H04L 25/0212* (2013.01); *H04L 27/265* (2013.01); *H04L 69/22* (2013.01); *H04L 1/0047* (2013.01); *H04L 1/0054* (2013.01); *H04L 27/2601* (2013.01)

(58) Field of Classification Search
    CPC . H04L 27/2601; H04L 27/265; H04L 1/0047; H04L 25/0212
    USPC .......................................... 375/341, 340, 316
    See application file for complete search history.

(56) References Cited

U.S. PATENT DOCUMENTS

| | | |
|---|---|---|
| 8,503,548 B2 | 8/2013 | Lo et al. |
| 8,625,697 B2 | 1/2014 | Chiang et al. |
| 2004/0013172 A1* | 1/2004 | Hashiguchi ............ H04B 1/707 375/148 |
| 2005/0069023 A1 | 3/2005 | Bottomley et al. |
| 2006/0251156 A1 | 11/2006 | Grant et al. |
| 2008/0292015 A1 | 11/2008 | Lee |
| 2010/0020896 A1 | 1/2010 | Willems et al. |
| 2010/0067629 A1* | 3/2010 | Gaddam ............... H04L 25/022 375/346 |

OTHER PUBLICATIONS

"Australian Application No. 9. 2015904910, Australian Search Report dated Oct. 21, 2016", (Oct. 21, 2016), 7 pgs.

* cited by examiner

*Primary Examiner* — Kevin M Burd
(74) *Attorney, Agent, or Firm* — Schwegman Lundberg & Woessner, P.A.

(57) ABSTRACT

The present invention relates to a method and apparatus for adaptive channel estimation for signal-amplitude-based communications systems. In one arrangement, the method comprises: receiving an observation (r) of a transmitted coded symbol (d); generating, with a weight generator, a first coefficient (v) for weighting the received observation based on an estimate of the transmitted coded symbol (d_est), the first coefficient having a magnitude that is invariable with the amplitude of the transmitted coded symbol; and forming a new channel estimate (h_est) based on a weighted observation using the first coefficient (v).

19 Claims, 6 Drawing Sheets

-- PRIOR ART --

ADAPTIVE CHANNEL ESTIMATION

CLAIM OF PRIORITY

This application claims the benefit of priority of Australia Patent Application No. 2015904910, filed on Nov. 27, 2015, the benefit of priority of which is claimed hereby, and which is incorporated by reference herein in its entirety.

FIELD OF THE INVENTION

The present invention relates to a method and apparatus for adaptive channel estimation for signal-amplitude-based communications systems.

BACKGROUND OF THE INVENTION

Referring to FIG. 1A, in a wireless communications system, a transmitter 110 and a receiver 120 communicate via a wireless communications channel 150. The transmitter may include an encoder 112 which encodes input information bits into coded bits, and a modulator 118 which modulates the coded bits into a suitable signal format at radio-frequency (RE) frequencies for wireless transmission by the transmitting antenna through the communications channel 150.

In practice, the effects of the communication channel 150 are to distort the RE signal by, for example, introducing noise, timing jitters, frequency offsets and multipath fading. The role of the encoder 112 is to add redundancy to the transmitted data so that errors due to such signal distortions can be corrected after the distorted RE signal is received and demodulated at the receiver 120.

At the receiver 120, a receiving antenna receives the distorted RF signal. The receiver 120 includes a demodulator 122 to demodulate the received RF signal to generate received bits 124. The received bits 124 generally differ from the coded bits 116 due to the signal distortions. The receiver 120 also includes a decoder 126 to decode the received bits. The decoding process generates an estimate 128 of the information bits 114 by essentially reversing the operation of encoder and, in doing so, attempting to recover the information bits 114 in the presence of the signal distortions. The receiver 120 further includes a channel estimator 130 to counteract the effects of the channel 150. FIG. 1A illustrates that the decoder 126 in the illustrated example includes a Viterbi decoder preceded by a block for preparing inputs for the computation of branch metrics. The decoder 126 estimates the information bearing bits, which are re-encoded to allow use as training symbols in channel estimation. The accuracy of the estimated channel will determine the performance of the receiver 120. The transmitter/receiver may include other components which are omitted from FIG. 1A, such as an interleaver/de-interleaver, a scrambler/de-scrambler, and a puncturer/depuncturer.

In the case of an orthogonal frequency division multiplexing (OFDM) based system, the received jth subcarrier in the ith data bearing OFDM symbol of a packet is modelled as $$r[i,j]=h[i,j]d[i,j]+n[i,j]$$

where $h[i,j]$ is the frequency domain channel affecting subcarrier j in symbol i, $d[i,j]$ is the symbol sent at the transmitter, and $n[i,j]$ is noise affecting the subcarrier.

In one implementation, the demodulation includes channel equalisation where the received subcarrier $r[i,j]$ has the channel effects counteracted via division $d_{est}[i,j]=r[i,j]/h_{est}[i,j]$. Similarly, there exists a method of channel estimation where a channel estimate $h_{est}$ is computed based on the division of a received symbol r by an estimate of the transmitted symbol $d_{est}$ as follows:

$$h_{est}[i,j]=r[i,j]/d_{est}[i,j], \qquad (0)$$

where i represents the symbol index and j represents the subcarrier channel index.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the invention, there is provided a method of adaptive channel estimation, the method comprising: receiving an observation (r) of a transmitted coded symbol (d); generating, with a weight generator, a first coefficient (v) for weighting the received observation based on an estimate of the transmitted coded symbol (d_est), the first coefficient having a magnitude that is invariable with the amplitude of the transmitted coded symbol; forming a new channel estimate (h_est) based on a weighted observation using the first coefficient (v).

The first coefficient may be based on the quotient of the complex conjugate (d_est*) of the estimate of the transmitted coded symbol to the magnitude (|d_est|) of the estimate of the transmitted coded symbol.

According to a second aspect of the invention there is provided a method of adaptive channel estimation, the method comprising: receiving an observation (r) of a transmitted coded symbol (d); generating, with a weight generator, a first coefficient (v) for weighting the received observation based on an estimate of the transmitted coded symbol (d_est); generating, with the weight generator, a second coefficient (beta) for weighting an initial channel estimate based on the estimate of the transmitted coded symbol (d_est); and combining, with a combiner, a weighted observation using the first coefficient and a weighted initial channel estimate using the second coefficient to form a new channel estimate (h_est).

Combining may include generating a linear combination of the observation and the initial channel estimate.

Generating a first coefficient may include generating the first coefficient based on the complex conjugate (d_est*) of the estimate of the transmitted coded symbol and the magnitude (|d_est|) of the estimate of the transmitted coded symbol. The first coefficient may be generated based on the quotient of the complex conjugate (d_est*) to the magnitude (|d_est|) of the estimate of the transmitted symbol.

Generating a second coefficient may include generating an increased second coefficient for a decreased magnitude (|d_est|) of the estimate of the transmitted coded symbol.

The first coefficient may equal α (d_est*)/|d_est|, and the second coefficient may equal 1−α |d_est|, where α is between 0 and 1.

Generating a first coefficient and/or generating a second coefficient may include retrieving the first coefficient and/or the second coefficient from a look-up table containing entries of all possible transmitted coded symbols.

The estimate of the transmitted coded symbol may be obtained from decoder traceback outcomes.

The initial channel estimate may be obtained based on a preamble of a packet.

Alternatively, the initial channel estimate may be obtained based on channel estimates obtained from one or more previous symbol periods.

The new channel estimate may be a channel estimate for a subcarrier in an OFDM communications system, and the method may further comprise generating the initial channel estimate for the subcarrier by smoothing channel estimates for a plurality of subcarriers.

Combining may include a linear combination of the observation and the initial channel estimate.

According to a third aspect of the invention, there is provided an adaptive channel estimator comprising: an input for receiving an observation (r) of a transmitted coded symbol (d); a weight generator for generating: a first coefficient (v) for weighting the received observation based on an estimate of the transmitted coded symbol, and a second coefficient (beta) for weighting an initial channel estimate based on the estimate of the transmitted coded symbol (d_est); and a combiner for combining a weighted observation using the first coefficient and a weighted initial channel estimate using the second coefficient to form a new channel estimate (h_est).

The combiner may be configured to generate a linear combination of the observation and the initial channel estimate to form the new channel estimate (h_est). The weight generator may include a look up table for retrieving at least one of the weights based on the estimate the transmitted coded symbol (d_est).

The adaptive channel estimator may further include a frequency domain smoothing unit for generating the initial channel estimate for a subcarrier by smoothing channel estimates for a plurality of subcarriers.

The adaptive channel estimator may include a symbol delay block for providing synchronisation between the input of the combiner and the output of the frequency domain smoothing unit.

Further aspects of the present invention and further embodiments of the aspects described in the preceding paragraphs will become apparent from the following description, given by way of example and with reference to the accompanying drawings.

DETAILED DESCRIPTION OF EMBODIMENTS

Introduction

The channel estimation method according to equation (0) (herein after the "division method") potentially gives rise to undesirable noise amplification in a signal-amplitude-based communications system, that is, a system which relies at least partially on the signal amplitude or power to differentiate one constellation point from another. An example includes a 16-state quadrature amplitude multiplexed (16-QAM) system. An example of a system not affected by this problem is a phase-shift-keying (PSK) based system.

The potential noise amplification in the division method may be understood as follows. Substituting the received symbol r as the product of the actual channel h and transmitted symbol d with additive noise n, the channel estimate is given by:

$$h_{est}[i,j] = (h[i,j]d[i,j] + n[i,j])/d_{est[i,j]} \quad (1)$$

Assuming the estimate of the transmitted symbol (or hereinafter "training symbol") is correct or is a good approximation of the actual transmitted symbol (that is, $d[i,j] \approx d[i,j]$) the channel estimate is further given by:

$$h_{est}[i,j] = h[i,j] + z[i,j] \text{ where } z[i,j] = n[i,j]/d[i,j] \quad (2)$$

Figure 1A:
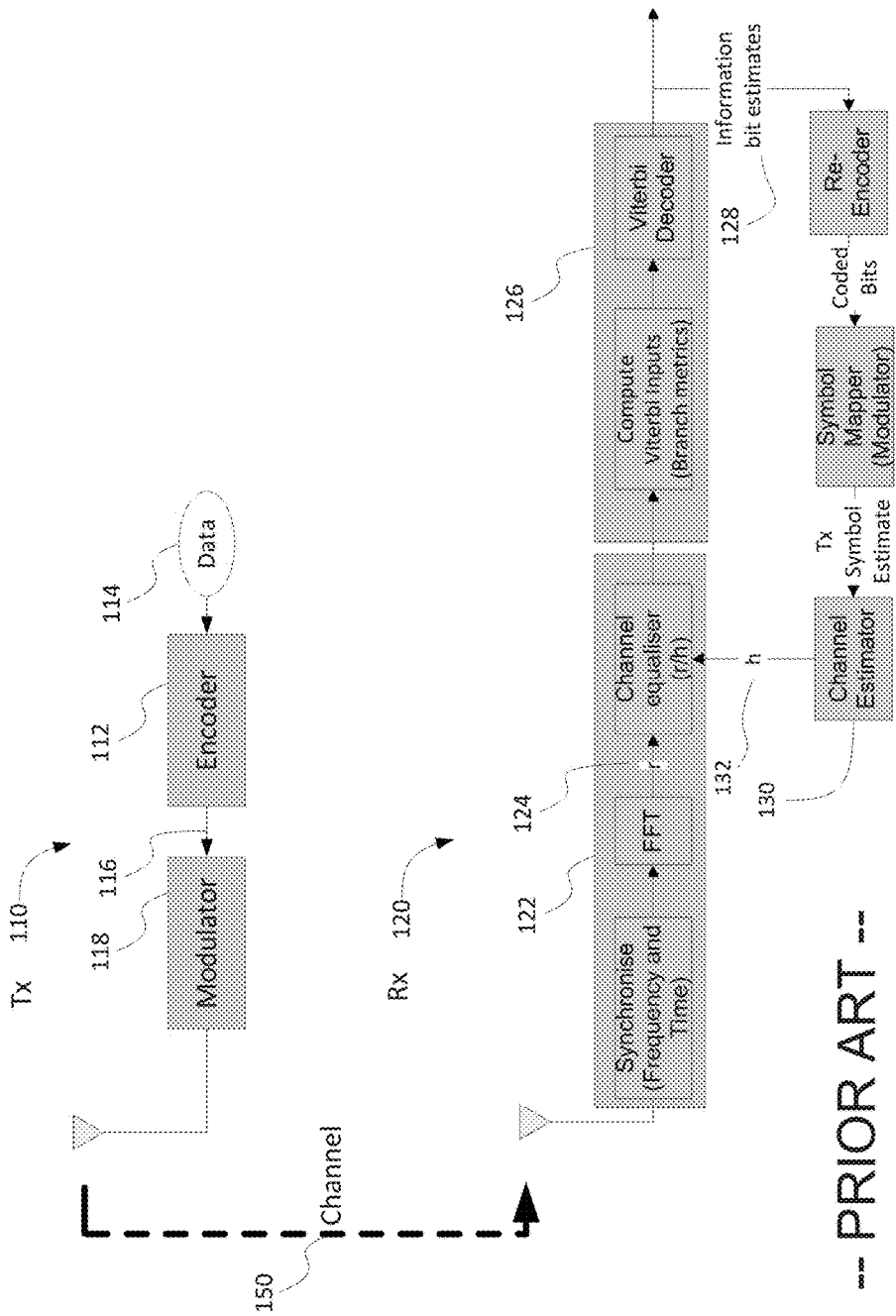
FIG. 1A illustrates a schematic diagram of a wireless communications system including a transmitter and a receiver.
Figure 1C:
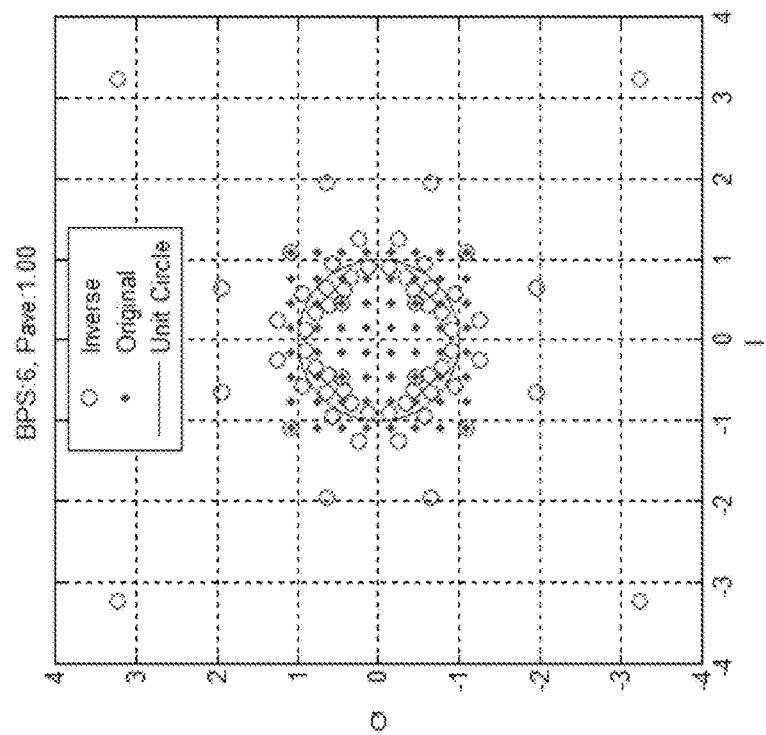
FIGS. 1B and 1C illustrate noise amplification in a 16-quadrature-amplitude-multiplexed (QAM) system and 64-QAM system, respectively.
Figure 1B:
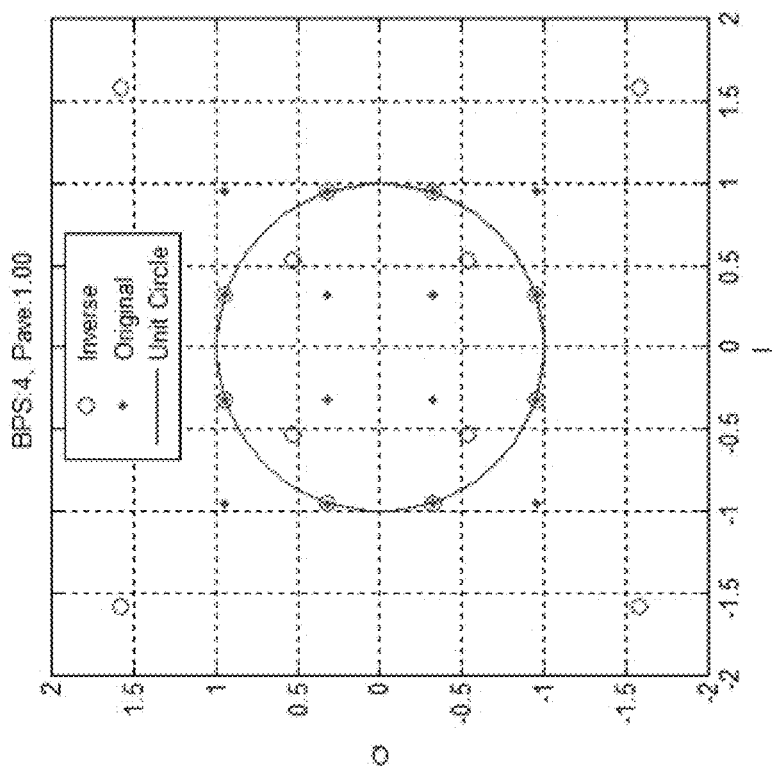

The corresponding noise power in z is therefore amplified by $1/|d[i,j]|^2$, where $|x|$ denotes the magnitude of x. In other words, in the case of a QAM modulation format, smaller-magnitude signals or "inner" constellation points may suffer from more severe noise amplification than larger-magnitude signals or "outer" constellation points. For example, the innermost points in a 16-QAM constellation (as illustrated in FIG. 1B) are subject to noise amplification of approximately 5 (in power terms relative to a unit power training symbol (e.g QPSK)), whereas the innermost points of a 64-QAM constellation (as illustrated in FIG. 1C) are subject to noise amplification of approximately 21 (in power terms relative to a unit power training symbol (e.g QPSK)).

Having appreciated the noise amplification problem, the inventors have also devised a solution to reduce or address this problem. Accordingly, also disclosed herein are a method and an apparatus for adaptive channel estimation. The disclosure is applicable to, for example, QAM-based systems (particularly 16-QAM and above). The disclosure is also applicable to OFDM or non-OFDM communication systems.

Adaptive Channel Estimation

Figure 2A:
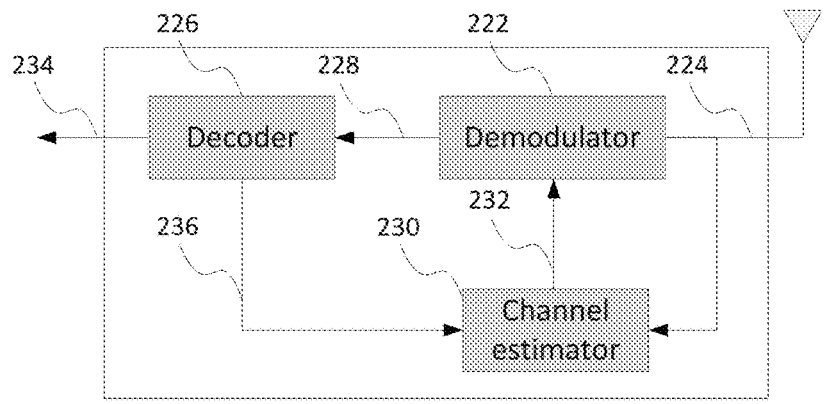
FIG. 2A illustrates an embodiment of a method of adaptive channel estimation.
Figure 2B:
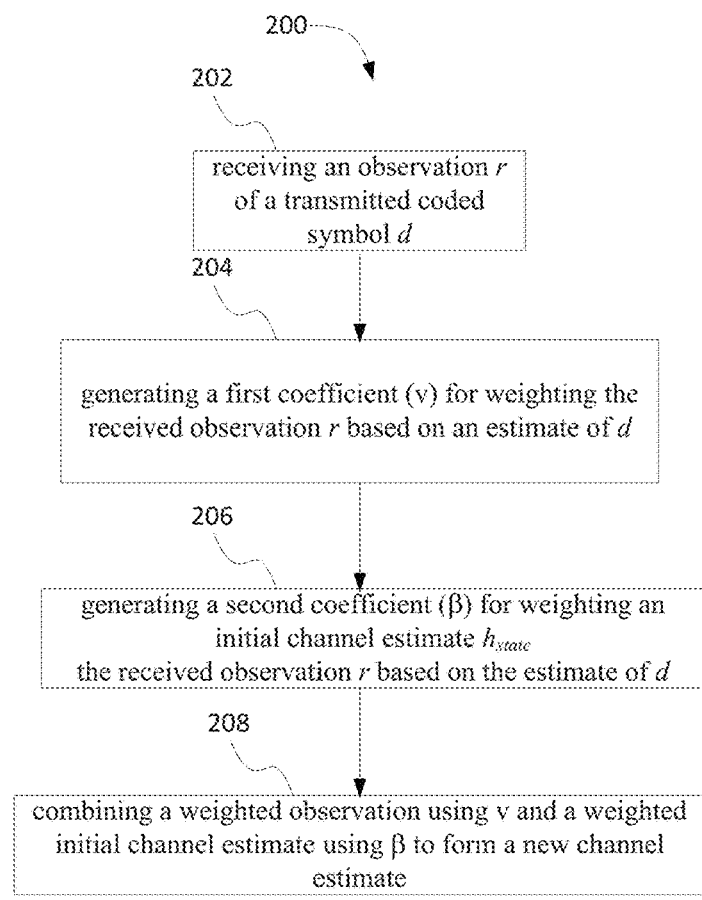
FIG. 2B illustrates an embodiment of an apparatus for adaptive channel estimation.

FIGS. 2A and 2B illustrate a schematic diagram of the apparatus 210 and a method 200, respectively, for adaptive channel estimation. The channel estimation is "adaptive" in that the channel estimation takes into account the signal amplitude. The apparatus 210 includes a demodulator 222, a channel estimator 230 and a decoder 226. The demodulator 222 may resemble but need not be identical to the demodulator 122. For example, the demodulator 222 may include a bit log-likelihood ratio (LLR) computation module instead of an equaliser. Similarly, the decoder 226 may resemble but need not be identical to the decoder 126. For example, the decoder 226 may be configured to decoding a coded symbol by way of a decoding algorithm other than Viterbi decoding.

The demodulator 222 demodulates a received observation 224 (r) of a transmitted coded symbol (d) based on the channel estimate 232 (h) by, for example, channel equalisation r/h. The equalised observation 228 (r/h) is provided to the decoder 226 for decoding. The decoder outcomes include information bit estimates 234. The decoder outcomes may also include estimates 236 of the transmitted coded bits, either by re-encoding the information bit estimates 234 or by virtue of an additional output of some types of decoders, such as the Viterbi decoder. In any case, the decoder outcomes 236 may be provided to the channel estimator 230 for generating an updated channel estimate 232. The method 200 may be performed by the channel estimator 230 (with further details on the channel estimator described below). The method 200 includes the step 202 of receiving an observation r of a transmitted coded symbol d, the step 204 of generating a first coefficient for weighting the received observation r based on an estimate of the transmitted coded symbol, the step of 206 of generating a second coefficient for weighting an initial channel estimate based on the estimate of the transmitted coded symbol and an initial or a past channel estimate ($h_{state}$), and the step 208 of combining a weighted observation using the first coefficient and a weighted initial channel estimate using the second coefficient to form a new channel estimate. In one implementation, in step 204, the first coefficient is generated based on the complex conjugate and the magnitude of the transmitted coded symbol $d_{est}^*$ and $|d_{est}|$. As described in more detail below, the weighting based on $d_{est}^*$ and $|d_{est}|$ effectively shifts the dependence on signal amplitude from the noise power component to the channel estimate component in the received observation, while the weighting based on $h_{state}$ has an effect of reducing or otherwise compensating the dependence on signal amplitude shifted to the channel estimate. The combined effects of the weighting result in a channel estimate whose noise component is independent of signal amplitude.

In the receiving step 202, the observation r is received by the apparatus 210 and provided to the channel estimator 230. For the per-subcarrier-j observation model, the observation r is given by r=h d+n. The disclosed method does not rely on dividing r by the estimate of the transmitted coded symbol $d_{est}$ used as the training symbol to isolate the channel estimate h. Instead, in the step 204, at least in one embodiment, the observation r is multiplicatively weighted by $d_{est}^*/|d_{est}|$. This weighting creates a modified observation $r_{mod}$ (assuming that the estimate of the transmitted symbol is correct or a good approximation of the actual transmitted symbol (that is, $d_{est} \cong d$)):

$$r_{mod}=d_{est}^*/|d_{est}|r \cong |d_{est}|h+d_{est}^*/|d_{est}|n \quad (3)$$

where the noise component of $r_{mod}$ has power:

$$E[|d_{est}^*/|d_{est}|n|^2]=E[|d_{est}^*/|d_{est}||^2]E[n^2]=1 \cdot \sigma^2=\sigma^2 \quad (4)$$

where E|X| denotes the expected value of X.

From Equation (4) it should be appreciated that the power of the noise component in $r_{mod}$ is independent of the symbol amplitude. The weight $d_{est}^*/|d_{est}|$ applied to the received observation therefore decouples the noise component of the received observation from the symbol amplitude. Equation (3) indicates however that the channel component within $r_{mod}$ is scaled by $|d_{est}|$, or that $r_{mod}$ includes a biased channel estimate $H_{est}=|d_{est}|$ h. In other words, the multiplicative weighting has the effect of preserving the noise power at the expense of the desired channel estimate component being scaled by the absolute value of $d_{est}$. In other embodiments, a similar effect may be achieved where the multiplicative weighting involves a further constant α, where $r_{mod}$ is generated by multiplying r by α $d_{est}^*/|d_{est}|$, resulting in a biased channel estimate $H_{est}=\alpha |d_{est}|$ h. In some embodiments, in the step 206, to at least partially compensate for such a bias, a second coefficient β is generated so that a variable proportion β of the initial or past channel estimate $h_{state}$ (or hereinafter the "state") can additively weight the biased channel estimate $H_{est}$. The second coefficient β is generated based on, such as complementary to, this bias to generate a compensated channel estimate $h_{est}$. For example, if a particular estimated symbol $d_{est}$ is small in magnitude (e.g. an inner constellation point), then the biased channel estimate $H_{est}$ is additively weighted by a large proportion of the state ($h_{state}$). Conversely, if a particular estimated symbol $d_{est}$ is large in magnitude (e.g. an outer constellation point), then the biased channel estimate $H_{est}$ is additively weighted by a smaller proportion of the state $h_{state}$. That is, the second coefficient should increase for a decreased magnitude ($|d\_est|$) of the estimate of the transmitted coded symbol. In the generating step 208, a new channel estimate is formed by combining the weight observation using the first coefficient and a weighted initial channel estimate using the second coefficient. In effect, the initial or past channel estimate is multiplicatively and then additively weighted to form the new channel estimate.

In one embodiment, the same initial channel estimate $h_{state}$ may be used for the entire packet. For example, the initial channel estimate $h_{state}$ may be a preamble-based channel estimate. In an alternative embodiment, $h_{state}$ is continuously updated as being the channel estimate computed based on one or more previous symbol periods. In this alternative embodiment, as each compensated channel estimate being generated, the effects of the channel estimate compensation is accumulative over updates and revisions of the channel estimate channel. The accumulative property of such adaptive channel estimation provides that larger-amplitude symbols contribute to the channel estimate $h_{est}$ proportionally more than smaller-amplitude symbols. In the case of an orthogonal frequency division multiplexed (OFDM) system, $h_{state}$ may be computed by applying frequency domain smoothing over channel estimates of adjacent subcarriers, for example, by averaging the channel estimates for the (j−1)th, j-th and (j+1)-th subcarriers to obtain an initial or past channel estimate for the j-th subcarrier.

Linear Combination of Observation and State

The multiplicative weighting and the additive weighting may be combined to form a channel estimate by a linear combination of the received observation and the state. The goal is to generate combining coefficients or weights that compensate the biased channel estimate $H_{est}$.

In one embodiment, a channel estimate $h_{est}$ for symbol index i and subcarrier channel index j is generated by a linear combination of the corresponding observation r[i,j] and the initial or past channel estimate $h_{state}[j]$ in the form of:

$$h_{est}[i,j]=v[i,j]r[i,j]+\beta[i,j]h_{state}[j] \quad (5)$$

where $$v[i,j]=\alpha d_{est}^*/|d_{est}| \text{ and} \quad (6)$$

$$\beta[i,j]=1-\alpha|d_{est}| \quad (7)$$

are the combining coefficients for weighting, respectively, the received observation r and the state of the channel estimate $h_{state}$. v[i,j] is generally a complex number and β[i,j] is generally a real number. α is also generally a real number between 0 and 1. By setting α=1, the new channel estimate $h_{est}$ from the current symbol is heavily weighted while the state of the channel estimate $h_{state}$ is suppressed. As α is set at a decreased value from 1, $h_{est}$ is less weighted and the reliance on $h_{state}$ increases. Adjusting the value of α may be useful, for example in highly dynamic environments where the channel is changing rapidly. It is noted that the scaling factor v[i,j] is not equal to α multiplied by the inverse of the $d_{est}$, which would otherwise be expected to give rise to the undesirable noise amplification. The value α=0 represents the case where the channel estimate for all symbols is based entirely on the initial channel estimate (which, for example, is derived from preamble symbols) so that $h_{state}$ is not adapted to the current symbol.

In some arrangements, α is a fixed value over time. In other arrangements, α may be adjusted, altered or otherwise changed over time. Where the state of the environment is available (e.g. by extracting channel parameters from a previous packet or obtaining an input from a speed sensor indicating a high speed of the receiver), α may be adjusted dynamically. For example, α may be changed over time to values any between 0 (representing a non-adaptive channel) and 1 (representing a highly adaptive channel), such as increasing from 0 to 1. Additionally or alternatively, α may be derived by simulations over the expected channel environments for specific use cases.

The first term in Equation (5) is equivalent to the modified observation $r_{mod}$, which is generated by multiplicatively weighting r by $d_{est}*/|d_{est}|$ or α $d_{est}*/|d_{est}|$. As described above, the multiplicative weighting has the effect of preserving the noise power at the expense of the biasing the channel estimate by the absolute value of $d_{est}$. This is because the multiplicative weighting coefficient v[i,j] is so scaled that its magnitude is invariable with the amplitude of the transmitted coded symbol $|d_{est}|$. The second term in Equation (5) additively weights the modified observation $r_{mod}$ by a variable proportion of the initial or past channel estimate $h_{state}$ to at least partially compensate for the bias resulted from preserving the noise power. By substituting Equations (6) and (7) into Equation (5), and assuming that the estimate of the transmitted symbol is correct or a good approximation of the actual transmitted symbol (that is, $d_{est}\cong d[i,j]$) and assuming the initial or past channel estimate $h_{state}$ is correct (that is, $h_{est}[j]\cong h[i,j]$):

$$\begin{aligned} h_{est}[i,j] &= v[i,j]r[i,j] + \beta[i,j]h_{state}[j] \\ &\cong \alpha d[i,j]*/|d[i,j]|(h[i,j]d[i,j] + n[i,j]) + \\ &\quad (1-\alpha|d[i,j]|)h[i,j] \\ &\cong \alpha|d[i,j]|h[i,j] + z_{mod}[i,j] + (1-\alpha|d[i,j]|)h[i,j] \\ &\cong h[i,j] + z_{mod}[i,j] \end{aligned} \quad (8)$$

where $z_{mod}=\alpha(d[i,j]*/|d[i,j]|) n[i,j]$.

$z_{mod}$ is different from z (as given by Equation (2)) in that $z_{mod}$ is independent of the amplitude of because $d[i,j]*/|d[i,j]|$ has unit size. Equation (8) therefore indicates that the combining coefficients v and β as given by Equations (6) and (7) result in a channel estimate that is immune from the noise amplification arising from the "division method" (i.e. division of a received symbol r by an estimate of the transmitted symbol $d_{est}$ to generate a channel estimate). In other words, processing a received observation based on combining coefficients v and β results in a stable channel estimate $h_{est}$.

Figure 3:
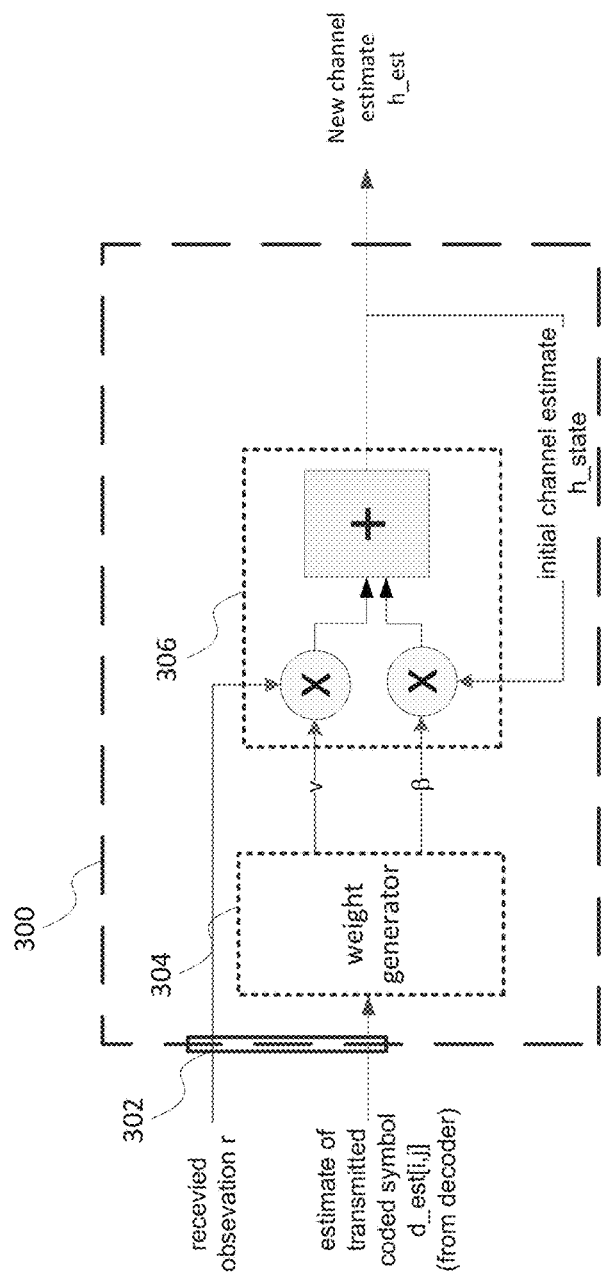
FIG. 3 illustrates an embodiment of art adaptive channel estimator.

Also described herein is an adaptive channel estimator. FIG. 3 illustrates an embodiment 300 of the adaptive channel estimator. In this embodiment, the estimator includes an input 302 for receiving an observation (r) of a transmitted coded symbol (d), a weight generator 304 for generating: a first coefficient (v) for weighting the received observation (r) based on an estimate of the transmitted coded symbol ($d_{est}$) and a second coefficient (β) for weighting an initial or past channel estimate ($h_{state}$) based on the estimate of the transmitted coded symbol ($d_{est}$), and a combiner 306 for combining a weighted observation using the first coefficient and a weighted initial or past channel estimate using the second coefficient to form a new channel estimate. The combiner 306 may form the new channel estimate $h_{est}$ in accordance with Equations (5), (6) and (7). The combiner 306 receives r from the input 302, and v and β from the weight generator 304. The combiner 306 may be configured to receive $d_{est}$ from the decoder traceback outcomes or, alternatively, from re-encoding estimates of information bits. In the embodiment shown in FIG. 3, the $h_{state}$ is obtained from a past channel estimate. In other embodiments, $h_{state}$ may be calculated based on the preamble having a known sequence.

Figure 4:
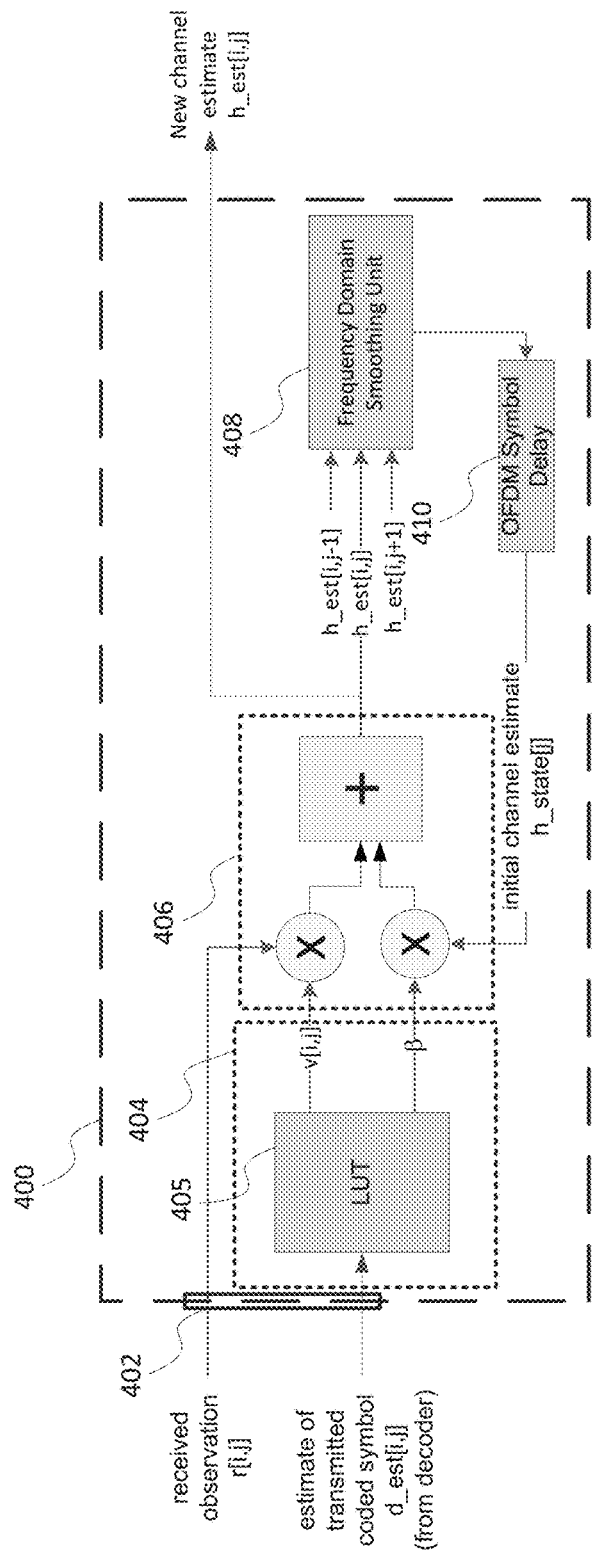
FIG. 4 illustrates another embodiment of an adaptive channel estimator.

FIG. 4 illustrates another embodiment 400 of the adaptive channel estimator suitable for use in an OFDM system. In this embodiment, similar to the embodiment 300 illustrated in FIG. 3, the estimator includes an input 402, a weight generator 404 and a combiner 406. To increase time efficiency and avoid intensive computation, the weight generator 404 includes a look-up table 405 containing entries of all possible transmitted coded symbols, each of which is mapped on to a respective pair of first coefficient v and second coefficient β. The look-up table 405 receives as an input an estimate of a transmitted coded symbol $d_{est}$, for example from decoder traceback outcomes, and is configured to look up and return as an output a corresponding pair of first coefficient v and second coefficient β based on the received $d_{est}$.

The embodiment 400 in FIG. 4 also includes a frequency domain smoothing unit 408 for providing a smoothed channel estimate smoothed over multiple subcarrier channels. For example, the frequency domain smoothing unit 408 is configured to provide an average or a weighted average of the channel estimates for the (j-1)th, j-th and (j+1)-th subcarriers to obtain an initial channel estimate for the j-th subcarrier. This frequency domain smoothing may be done by taking into account any timing advance introduced by the fast-Fourier transform (EFT) window alignment. For example, for a 4-sample (10 MHz) advanced results in a 22.5° rotation from subcarrier to subcarrier, the coefficients for the frequency domain smoothing unit may be {exp [ j(−22.5) π/180]/4, ½, exp [j(+22.5) π/180]/4} which includes one sample on either side of the centre sample. The embodiment 400 of the adaptive channel estimator also includes a symbol delay block 410. The symbol delay block 410 provides synchronisation between the output of the frequency domain smoothing unit 408 and the input of the combiner 406, such that an initial channel estimate with a desired time delay (e.g. an integer multiple of a OFDM symbol period) is provided to the combiner 406 for generating the new channel estimate $h_{est}$. The desired time delay may be 1 to 2 symbol long, depending on the information bits in a symbol. Generally speaking, there is less delay for the more information bits. The time delay is provided to align or match the received symbol r with the estimate of the transmitted symbol $d_{est}$ so that both relate to the same OFDM symbol.

Figure 5:
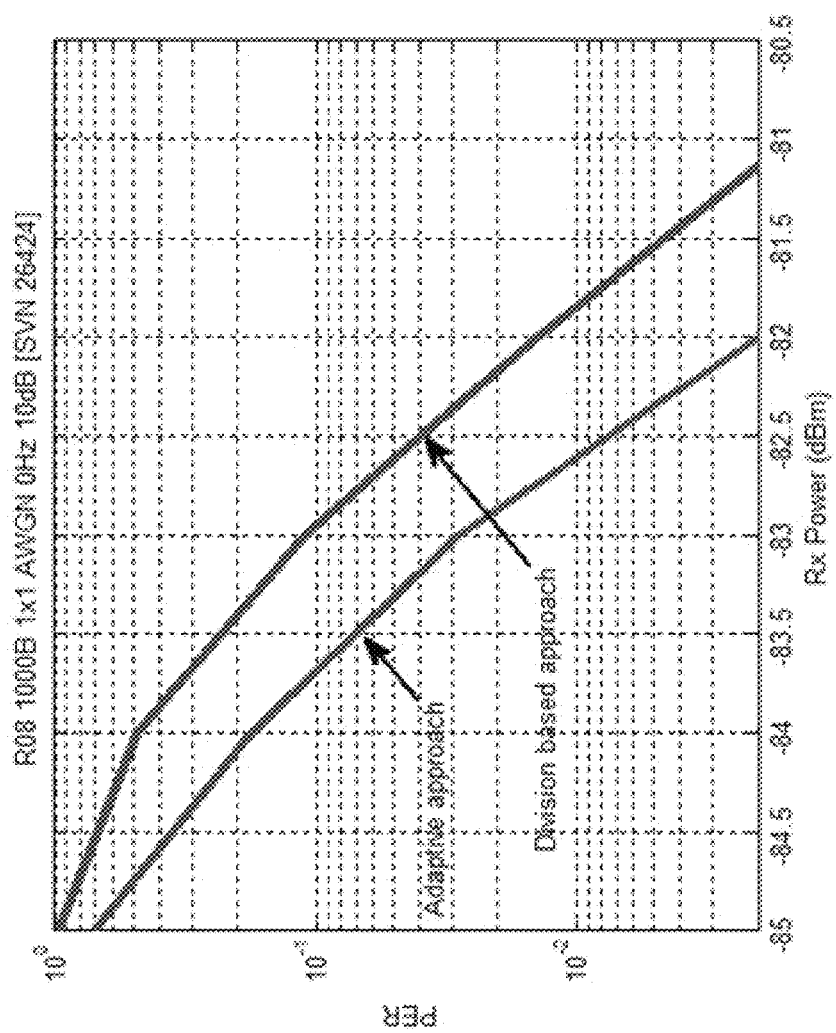
FIG. 5 illustrates a comparison with the division method in a plot of packet error rate versus receiver power.

In one embodiment, in comparison with the division method, in one case, the described method of adaptive channel estimation is shown by simulation to provide approximately 1 dB improvement in receiver sensitivity for a given packet error rate (PER), as shown in FIG. 5. This particular simulation assumes transmission of approximately 1000-byte packets in a communications link with an additive white-Gaussian noise (AWGN) channel for a Ricean fading K-factor of 10 dB, according to IEEE 802.11a/p standards at rate ID 08 using a modulation scheme of 64-CLAM with a coding rate of ⅔. The improvement in the PER may be attributed to the more contained noise statistics in the coded symbols as inputs into the decoder.

One or more of the components of the receiver 120 may be implemented as software, such as a computer program including instructions stored in a non-transitory computer-readable medium and executable by the one or more processors. In one example, the non-transitory computer-readable medium is a memory or storage module, such as volatile memory including a random access memory (RAM), non-volatile memory including read-only memory (ROM), or a harddisk. The one or more processors may be one or more computer processing units (CPUs). Alternatively or additionally the one or more of the components of the receiver 120 may be implemented as hardware, such as using one or more digital signal processors (DSPs), application-specific integrated circuits (ASICs) or field-programmable gate arrays (FPGAs).

Now that embodiments have been described, it should be apparent to the skilled person in the art that at least some examples of the described adaptive channel estimation have the following advantages:

Compared with the division method, the adaptive channel estimation method has the tendency to maintain the noise statistics irrespective of whether a received signal relates to an inner or an outer constellation point.

Improvement in receiver sensitivity has been observed.

It will be understood that the invention disclosed and defined in this specification extends to all alternative combinations of two or more of the individual features mentioned or evident from the text or drawings. For example, although specific modulation formats such as 16-QAM and 64-QAM are described and mentioned, it is expected that the disclosure applies to other modulation formats. All of these different combinations constitute various alternative aspects of the invention.

What is claimed is:

1. A method comprising:
at a wireless receiver in wireless communication with a wireless transmitter, adaptively estimating a wireless communication channel between the wireless receiver and the wireless transmitter by:
receiving via an antenna an observation (r) of a transmitted coded symbol (d);
generating, by an adaptive channel estimator, a first coefficient (v) for weighting the received observation based on an estimate of the transmitted coded symbol (d_est), the first coefficient having a magnitude that is invariable with an amplitude of the transmitted coded symbol;
forming, by the adaptive channel estimator, a new channel estimate (h_est) based on a weighted observation using the first coefficient (v); and
estimating, at a decoder, information bits of a subsequently transmitted coded symbol using the new channel estimate.

2. The method of claim 1 wherein the first coefficient is based on a quotient of the complex conjugate (d_est*) of the estimate of the transmitted coded symbol to a magnitude (|d_est|) of the estimate of the transmitted coded symbol.

3. The method of claim 1 wherein the estimate of the transmitted coded symbol is obtained from decoder traceback outcomes.

4. A method of adaptive channel estimation at a wireless receiver in wireless communication with a wireless transmitter, the method comprising:
receiving, at an antenna, an observation (r) of a transmitted coded symbol (d);
generating, at an adaptive channel estimator, a first coefficient (v) for weighting the received observation based on an estimate of the transmitted coded symbol (d_est);
generating, at the adaptive channel estimator, a second coefficient (beta) for weighting an initial channel estimate based on the estimate of the transmitted coded symbol (d_est);
combining, at an adaptive channel estimator, a weighted observation using the first coefficient and a weighted initial channel estimate using the second coefficient to form a new channel estimate (h_est); and
estimating, at a decoder, information bits of a subsequently transmitted coded symbol using the new channel estimate.

5. The method of claim 4 wherein combining includes generating a linear combination of the observation and the initial channel estimate.

6. The method of claim 4 wherein generating a first coefficient includes generating the first coefficient based on a complex conjugate (d_est*) of the estimate of the transmitted coded symbol and a magnitude (|d_est|) of the estimate of the transmitted coded symbol.

7. The method of claim 6 wherein the first coefficient is generated based on a quotient of the complex conjugate (d_est*) to the magnitude (|d_est|) of the estimate of the transmitted symbol.

8. The method of claim 4 wherein generating the second coefficient includes generating an increased second coefficient for a decreased magnitude (|d_est|) of the estimate of the transmitted coded symbol.

9. The method of claim 4 wherein the first coefficient equals a (d_est*)/|d_est|, and the second coefficient equals 1−α|d_est|, where a is between 0 and 1.

10. The method of claim 4 wherein generating the first coefficient and/or generating the second coefficient includes retrieving the first coefficient and/or the second coefficient from a look-up table containing entries of all possible transmitted coded symbols.

11. The method of claim 4 wherein the initial channel estimate is obtained based on a preamble of a packet.

12. The method of claim 4 wherein the initial channel estimate is obtained based on channel estimates obtained from one or more previous symbol periods.

13. The method of claim 4 wherein the new channel estimate is a channel estimate for a subcarrier in an OFDM communications system, the method further comprising generating the initial channel estimate for the subcarrier by smoothing channel estimates for a plurality of subcarriers.

14. The method of claim 4 wherein the combining includes a linear combination of the observation and the initial channel estimate.

15. A wireless receiver in wireless communication with a wireless transmitter, the wireless receiver estimating a wireless communication channel between the wireless receiver and the wireless transmitter, the wireless receiver comprising:
an antenna for receiving an observation (r) of a transmitted coded symbol (d);
an adaptive channel estimator for:
generating a first coefficient (v) for weighting the received observation based on an estimate of the transmitted coded symbol,
generating a second coefficient (beta) for weighting an initial channel estimate based on the estimate of the transmitted coded symbol (d_est); and
combining a weighted observation using the first coefficient and a weighted initial channel estimate using the second coefficient to form a new channel estimate (h_est); and a decoder estimating information bits of a subsequently transmitted coded symbol using the new channel estimate.

16. The wireless receiver of claim 15 wherein the adaptive channel estimator is configured to generate a linear combination of the observation and the initial channel estimate to form the new channel estimate (h_est).

17. The wireless receiver of claim 16 wherein the adaptive channel estimator includes a look up table for retrieving at least one-weight based on the estimate the transmitted coded symbol (d_est).

18. The wireless receiver of claim 15 further including a frequency domain smoothing unit configured to generate the initial channel estimate for a subcarrier by smoothing channel estimates for a plurality of subcarriers.

19. The wireless receiver of claim 18 wherein the adaptive channel estimator further includes a symbol delay block for providing synchronisation between the input of the combiner and the output of the frequency domain smoothing unit.

\* \* \* \* \*